(12) United States Patent
Barzacanos (10) Patent No.: US 8,581,691 B2
(45) Date of Patent: Nov. 12, 2013

(54) COMPUTER PROGRAM CONTROLLED SECURITY MECHANISM

(75) Inventor: Constantine A. Barzacanos, New York, NY (US)

(73) Assignee: Cisco Technology, Inc., San Jose, CA (US)

( * ) Notice: Subject to any disclaimer, the term of this patent is extended or adjusted under 35 U.S.C. 154(b) by 689 days.

(21) Appl. No.: 12/406,565

(22) Filed: Mar. 18, 2009

(65) Prior Publication Data

US 2010/0237987 A1    Sep. 23, 2010

(51) Int. Cl.
  *G05B 19/00*  (2006.01)
  *H04Q 9/00*  (2006.01)
  *E05B 65/44*  (2006.01)
  *E05B 11/00*  (2006.01)
  *H01H 9/22*  (2006.01)

(52) U.S. Cl.
  USPC ....... 340/5.54; 340/5.64; 340/5.73; 340/5.74; 70/78; 70/432; 361/160

(58) Field of Classification Search
  USPC .................................. 340/5.1–5.92, 3.1, 3.2
  See application file for complete search history.

(56) References Cited

U.S. PATENT DOCUMENTS

| | | | | |
|---|---|---|---|---|
| 4,891,503 A * | 1/1990 | Jewell | | 235/380 |
| 4,920,334 A * | 4/1990 | DeVolpi | | 340/568.4 |
| 5,490,200 A * | 2/1996 | Snyder et al. | | 340/7.1 |
| 5,646,605 A * | 7/1997 | Leonaggeo et al. | | 340/5.64 |
| 5,712,626 A * | 1/1998 | Andreou et al. | | 340/5.67 |
| 5,740,744 A * | 4/1998 | Nashirozawa et al. | | 109/24.1 |
| 5,917,407 A * | 6/1999 | Squire et al. | | 340/432 |
| 5,925,128 A * | 7/1999 | Harmon | | 726/36 |
| 6,076,385 A * | 6/2000 | Pedroso et al. | | 70/257 |
| 6,192,236 B1 * | 2/2001 | Irvin | | 455/420 |
| 6,323,782 B1 * | 11/2001 | Stephens et al. | | 340/10.31 |
| 6,708,879 B2 * | 3/2004 | Hunt | | 235/385 |
| 6,731,500 B2 * | 5/2004 | Allirot | | 361/679.34 |
| 6,820,562 B2 * | 11/2004 | Zodnik et al. | | 108/50.01 |
| 6,885,738 B2 * | 4/2005 | White et al. | | 379/102.06 |
| 6,987,441 B2 * | 1/2006 | Roeland | | 340/5.73 |
| 7,176,785 B2 | 2/2007 | Edogawa et al. | | |
| 7,266,849 B1 | 9/2007 | Gregory et al. | | |
| 7,310,158 B2 | 12/2007 | Nakao et al. | | |
| 7,362,227 B2 | 4/2008 | Kim | | |
| 7,495,543 B2 * | 2/2009 | Denison et al. | | 340/5.23 |
| 7,847,675 B1 * | 12/2010 | Thyen et al. | | 340/5.2 |
| 7,898,439 B2 * | 3/2011 | Bettez et al. | | 340/999 |
| 8,239,062 B2 * | 8/2012 | Vahlberg et al. | | 700/236 |
| 8,471,675 B2 * | 6/2013 | Couto et al. | | 340/4.61 |
| 2005/0088279 A1 * | 4/2005 | Denison et al. | | 340/5.23 |

(Continued)

*Primary Examiner* — Daniel Wu
*Assistant Examiner* — Muhammad Adnan
(74) *Attorney, Agent, or Firm* — Patent Capital Group (57) ABSTRACT

An apparatus is provided in one example embodiment and includes a locking member configured to be coupled to a case that contacts an electronic component, the locking member being part of a security protocol having a secure mode and a disabled mode. The secure mode restricts access to the electronic component and the disabled mode provides access to the electronic component. A signal receiver is configured to be coupled to the locking member to electronically control the locking member in order to switch between the modes. In more specific embodiments, the signal receiver receives instructions for switching the modes from a remote device configured to be coupled to a network. The remote device receives a password from an end user seeking to switch to one of the modes and the remote device switches between the modes if the password is authenticated.

21 Claims, 5 Drawing Sheets

(56) References Cited

U.S. PATENT DOCUMENTS

| | | |
|---|---|---|
| 2005/0285716 A1* | 12/2005 | Denison et al. ............... 340/5.2 |
| 2006/0145847 A1* | 7/2006 | Simpson et al. ........... 340/568.1 |
| 2007/0247276 A1* | 10/2007 | Murchison et al. ........... 340/5.2 |
| 2008/0036611 A1* | 2/2008 | Noblitt ...................... 340/573.3 |
| 2008/0191867 A1* | 8/2008 | Markovich ............... 340/539.13 |
| 2009/0124376 A1* | 5/2009 | Kelly et al. ..................... 463/29 |
| 2010/0283575 A1* | 11/2010 | Tubb et al. ..................... 340/5.1 |
| 2011/0025459 A1* | 2/2011 | Denison et al. .............. 340/5.51 |

* cited by examiner

FIG. 7

COMPUTER PROGRAM CONTROLLED SECURITY MECHANISM

TECHNICAL FIELD OF THE INVENTION

The present disclosure relates generally to device security and, more particularly, to a computer program controlled security mechanism.

BACKGROUND OF THE INVENTION

Most computer systems (laptop, workstation, servers) allow free access to the systems internal area, where the motherboard, expansion cards, hard disk, memory, and other interfaces reside. This free access to the systems internal hardware area can result in computer parts theft or in unintended (or intended) damage to the system. Accordingly, such access should be regulated, restricted, or otherwise controlled in some manner.

BRIEF DESCRIPTION OF THE DRAWINGS

In order to provide a better understanding, example embodiments will now be described in detail, by way of example only, with reference to the accompanying figures, in which.

DETAILED DESCRIPTION OF EXAMPLE EMBODIMENTS

Overview

An apparatus is provided in one example embodiment and includes a locking member configured to be coupled to a case that contacts an electronic component, the locking member being part of a security protocol having a secure mode and a disabled mode. The secure mode restricts access to the electronic component and the disabled mode provides access to the electronic component. A signal receiver is configured to be coupled to the locking member to electronically control the locking member in order to switch between the modes. In more specific embodiments, the signal receiver receives instructions for switching the modes from a remote device configured to be coupled to a network. The remote device receives a password from an end user seeking to switch to one of the modes and the remote device switches between the modes if the password is authenticated. The instructions can be provided by a software application being executed on the remote device. In yet other embodiments, the case includes a flap that can be opened in order to access internal space of the electronic component once the locking member has switched to the disabled mode.

Figure 1:
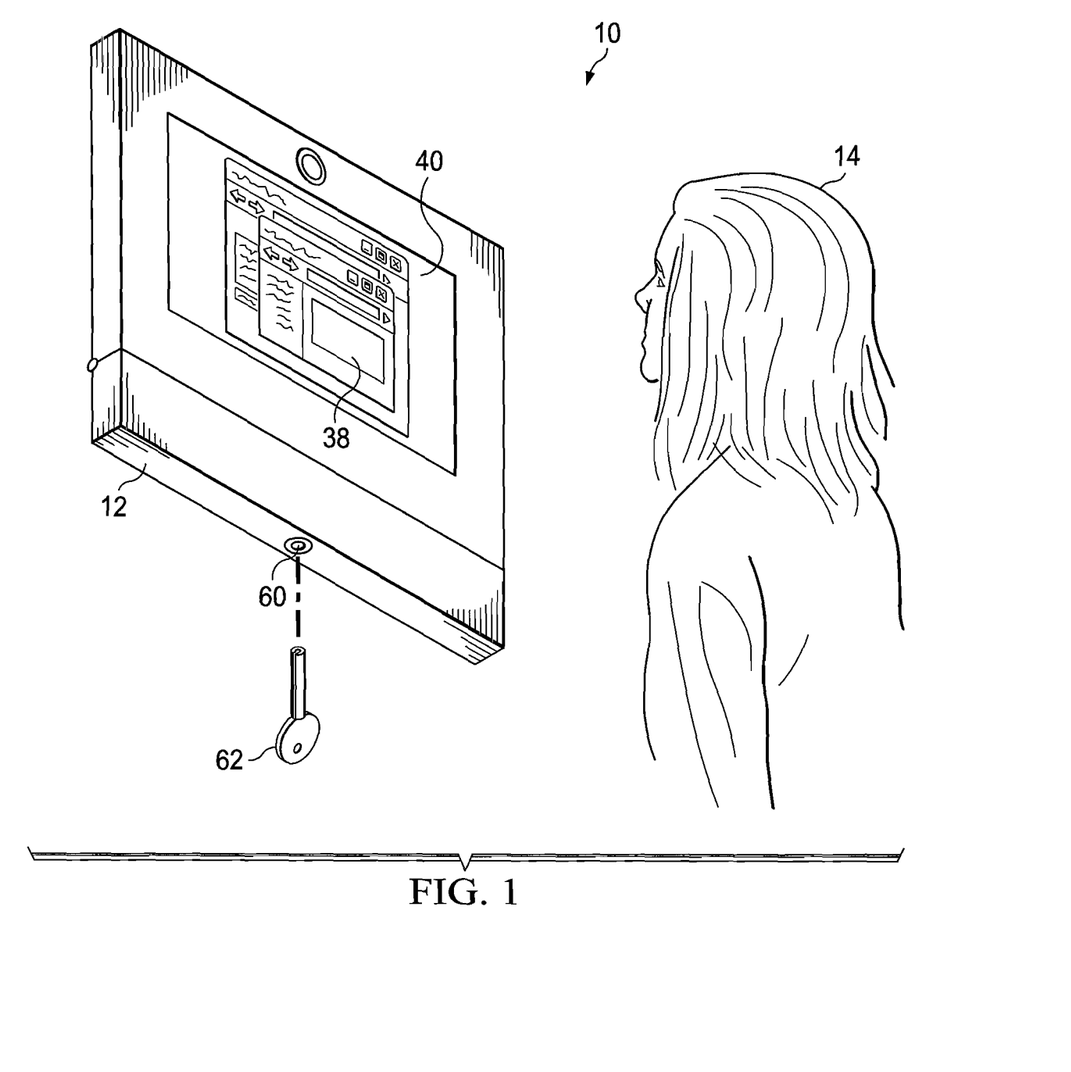
FIG. 1 is an example perspective view of an embodiment of a device having a security mechanism.
Figure 2:
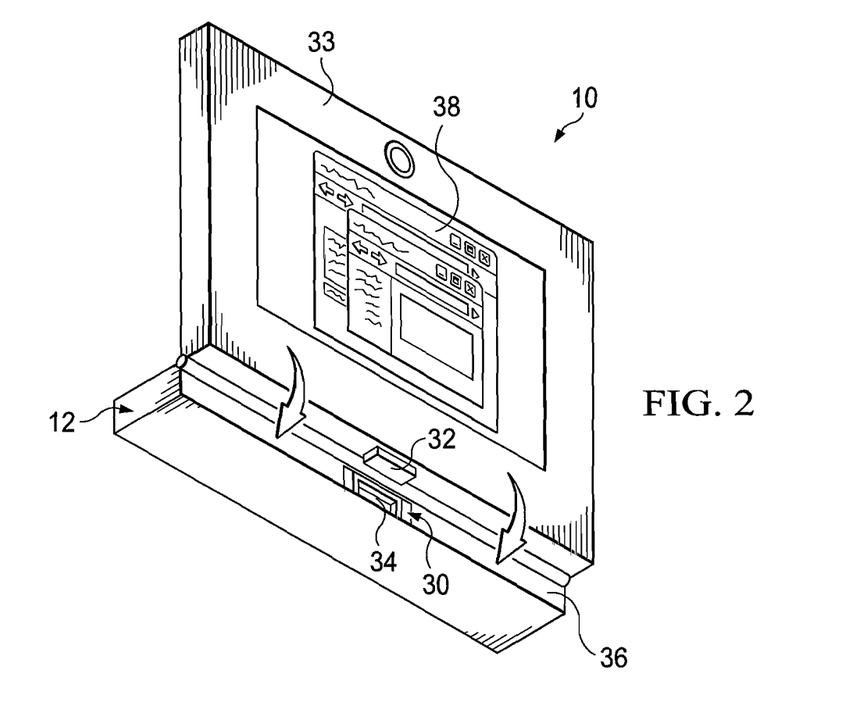
FIG. 2 is an example perspective view of the device of FIG. 1, the security mechanism being in a disabled mode.

FIGS. 1 and 2 illustrate an embodiment of a device 10 in accordance with one example implementation. In this embodiment, device 10 is a computing device such as a personal computer. In other embodiments, however, device 10 may be a server, a loadbalancer, a router, a bridge, a switch, or any other electronic device. Device 10 has a security mechanism that is hidden from view in FIG. 1. The security mechanism may have a secure mode and a disabled mode, the mode of the security mechanism can be controlled by a computer program, as further detailed below.

Figure 3:
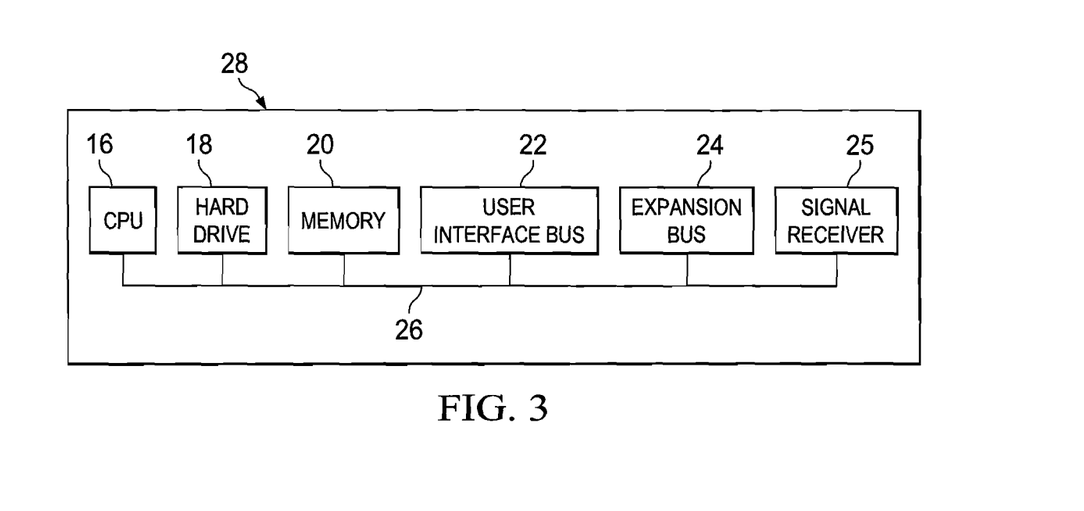
FIG. 3 is an example schematic diagram of operational components of the device of FIG. 1.

As shown in FIG. 2, device 10 can have an internal space 36 accessible by a flap or cover 12 that is removable or that is operable in a disabled mode but not in secure mode. As shown in example of FIG. 3, the space holds operational components 28 of device 10. In this embodiment, components 28 are in the form of hardware such as a central processing unit (CPU) 16, an (optional) hard drive 18, a memory element 20 (e.g., such as RAM), a user interface bus 22, an expansion bus 24, and a signal receiver 25. These are connected by a central bus 26. Before the flap is opened, the mode of the security mechanism is set to disabled mode.

Returning to FIG. 2, this illustration shows one embodiment of a security mechanism 30 having a movable locking member (in this example) in the form of a latch or bolt 32, which has a retracted position and an extended position. Bolt 32 is electromechanical in one example implementation. As used herein in this Specification, the term 'locking member' is inclusive of pins, rods, bolts, wires, cables, stoppers, chocks, or any other suitable element that can serve as a resistive force, or that inhibit physical movement in a security context involving any type of electronic component. A signal receiver is in communication with the security mechanism. On receiving a signal from a computer program running on CPU 16, in this embodiment, the signal causes security mechanism 30 to switch from one mode to the other. The movement of the bolt may be achieved by an electrical coil conducting a current controlled by the signal receiver, for example. The bolt may be a magnet located within the coil. In FIG. 2, the security mechanism is in the disabled mode and so the latch is retracted into a case 33 of device 10. This allows cover 12 to be opened for access to an internal space 36. In the secure mode, such as shown in FIG. 1, the bolt is in the extended position and is received into an aperture 34 formed in the flap. In this case, the flap cannot be opened and access to internal space 36 is denied. Note that as used herein in this Specification, the term 'cas' is meant to include any physical barrier or shell that can be used to restrict access to an associated electronic component for which security protection is sought. This could include an enveloping case structure, or a case structure in which only a portion (perhaps a sensitive or vulnerable area) of the electronic component is covered or shielded by the case.

The mode of security mechanism 30, at least in this embodiment, is determined by a computer program loaded and running on the operation components of device 10. The computer program provides a graphical user interface 38 to be displayed on a touch screen 40. In some embodiments, a keyboard and/or mouse forms part of the user interface, possibly instead of the touch screen. User interface 38 may be an administration interface built into device 10 by the devices manufacturer and usable only after a security protocol—such as the entry and authentication of a login and password—is successfully completed. Alternatively, user interface 38 may be provided by the devices Basic Input Basic Output (BIOS).

In one embodiment, a person 14 seeking access is a computer technician who knows or holds the relevant login and password. The owner or user of device 10 may not have the login and password. This lack of knowledge prevents the untrained owner or user attempting to modify or repair device 10. In another embodiment, the owner or user of device 10 does hold the relevant login and password. The password may correspond with the administrator's standard password on device 10. Access to operational components 28 may be controlled as per an organization's maintenance or support policy. For example, an owner or user 14 of device 10 may be given access to add or remove a card from expansion bus 24 but not to change CPU 16.

In some embodiments, a forced or unauthorized access will initiate a message or alert, such as a page or email, to a person or machine. The person may be an administrator. Device 10 may be configured to prevent unauthorized physical access to internal space 36. This may prevent access to the devices operational components 28. Theft of operation components may be thwarted and possible component damage may be prevented. The insertion of undesirable components into internal space 36, such as malignant operational components, may be prevented.

Figure 4:
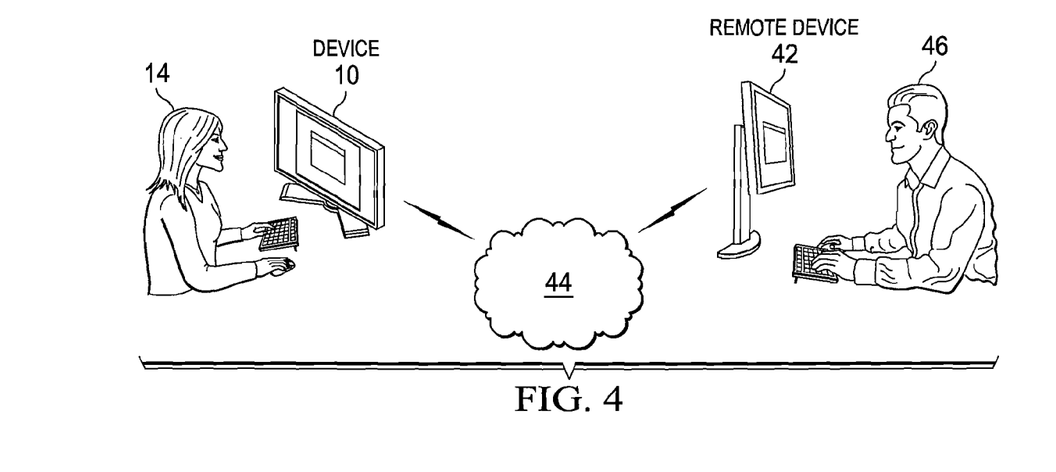
FIG. 4 is a schematic diagram of an example deployment of the device of FIG. 1.

In an example deployment of device 10 shown in FIG. 4, device 10 is in communication with a remote device 42 over a network 44. In this non-limiting example, network 44 is a local area network and remote device 42 is a computer used to serve devices such as device 10 on the network. The administration computer runs a program associated with the security mechanism. The associated program provides an interface for an administrator 46 to remotely control the mode of the security mechanism on device 10. The associated program may send instructions to the program running on device 10 activating the disabled mode and causing bolt 32 to retract. The administrative interface may display the state of the security mechanism (or multiple mechanisms on one or more devices if there are more of them), including secure, disabled, and malfunction states.

Figure 5:
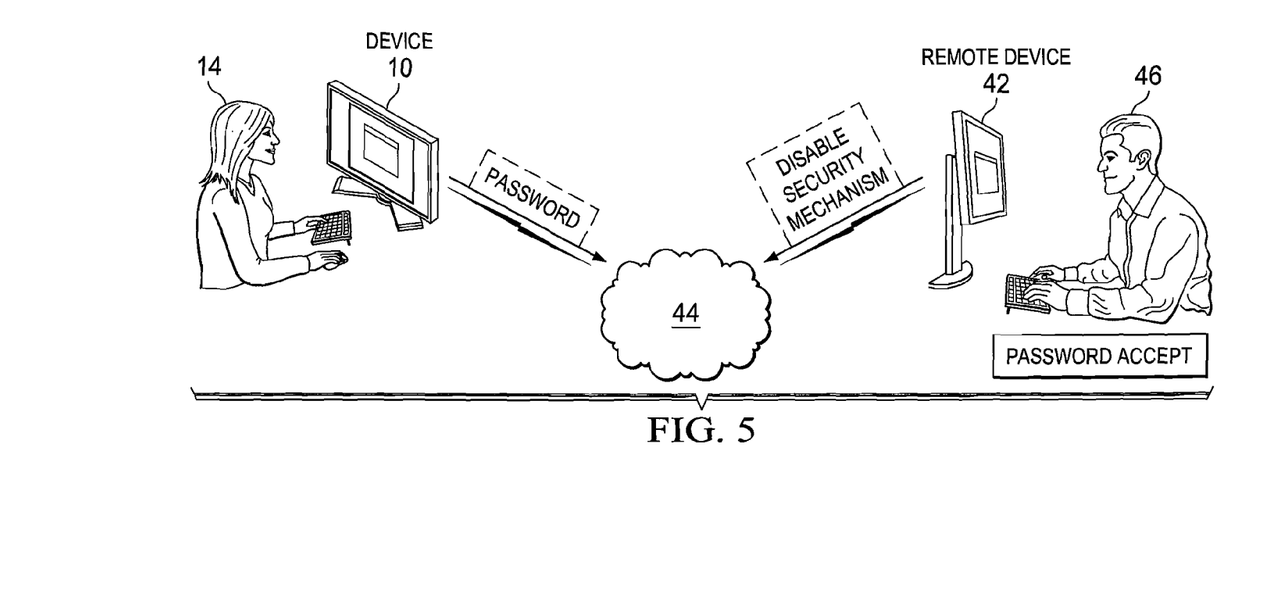
FIG. 5 is another schematic diagram of an example deployment of the device of FIG. 1.

FIG. 5 shows another example deployment of one embodiment of device 10. Network 44 is a Wide Area Network (WAN) [such as the Internet] in this example. Security mechanism 30 of device 10 may be controlled at least in part by an agent, such as administrator 46. In this embodiment, user 14 provides information to the remote agent. The information may be provided over network 44 to remote device 42. The agent checks the information and, if the information passes the agents scrutiny, the agent causes remote device 42 to send instructions to the computer program on device 10 to put security mechanism 30 in the disabled mode. The computer program on device 10 then puts the security mechanism in the disabled mode, in this embodiment, by retracting bolt 32. Once device 10 is in disabled mode, the person is able to open the flap and access internal space 36 and any operational components 28 therein. The agent may be a human, or alternatively a program running on remote device 42.

The information provided to the agent by user 14 may be one of, for example: a maintenance contract certificate number; a password (as depicted); biometric data (e.g., a fingerprint, or voice recognition sample); or information provided to the user when purchasing of a new or additional operating component. This information confirms that user 14 is entitled to access to operational components 28 in the particular circumstances. In some embodiments, the agent may be an agent of the device manufacturer or maintenance provider. In one embodiment, remote device 42 includes a web server and the information is provided via a web browser or similar component running on device 10. In another embodiment, the communication between remote device 42 and device 10 is via a meeting application or a similar program.

Figure 6:
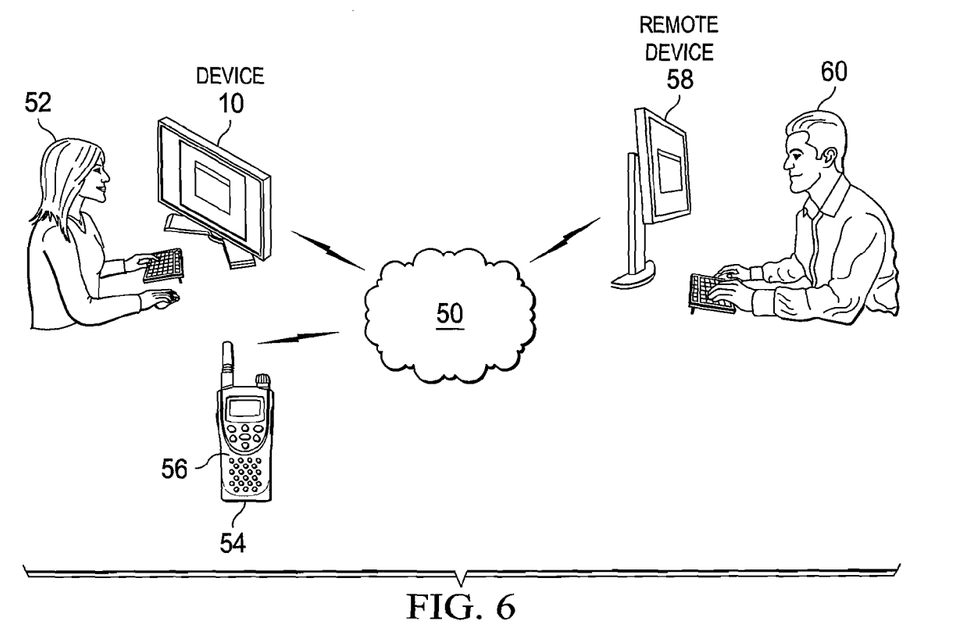
FIG. 6 is another schematic diagram of an example deployment of the device of FIG. 1.

FIG. 6 shows another example deployment of device 10. In this example, device 10 is connected to a network 50, such as the Internet. A person 52, such as a technician, carries a handheld wireless device 54 (such as a PDA or cell phone) that is also connected to network 50. The technician wishes to gain access to internal space 36 to work on device 10. Handheld wireless device 54 has a user interface 56 provided by a computer program running on it, the user interface being adapted to receive instructions from a technician for changing the security mechanism on device 10. The instructions are sent via handheld wireless device 54 and network 50 to a remote device 58. An agent 60, on completion of any security protocols, may react to the instructions by sending instructions via remote device 58 to the program on device 10 to retract bolt 32 and allow access to the internal space.

In some circumstances it may be desirable to gain access to the internal space without having to use the program on device 10 to disable the security mechanism, these circumstances including: device 10 has crashed; the device cannot be powered; the program controlling the security does not work; and the device is still in the factory and requires further work before being shipped. To accommodate these and any other circumstances, device 10 has a manually operated actuator 60, whereby the secure mode is overridden by operating actuator 60 making the internal space accessible. In this embodiment, the actuator is operated by a key 62, which is configured to be coupled to actuator 60 (as is shown in FIG. 1). Rotation of the key in a first direction causes bolt 32 to retract providing access to internal space 36. In some embodiments, the bolt can be extended by rotating the key in a direction opposite to the first direction putting the security mechanism back into secure mode. Key 62 may be a master key that opens a plurality of devices, each device being keyed differently. An administrator may hold the master key.

The security mechanism does not have to protect an internal space of device 10. In another embodiment shown in FIG. 7, for example, device 70 is arranged to be mounted in a structure 72. Device 70 may be a computing device, server, router, switch, or any other suitable device. Structure 72 may have rails such as 74 to support device 70. The security mechanism of device 70 comprises a movable locking member, in this embodiment, in the form of bolts (shown via their possible receiving slots 76 and 78), which have an extended position (secure mode) and a retracted position (disabled mode). The bolts can be extended to be located in corresponding apertures 84 and 86, formed in structure 72. This provides engagement with structure 72 in secure mode to prevent removal of the device from the structure. There may be other bolts on the hidden far side of device 70, which are locatable in apertures 80 and 82 of the structure. In disabled mode, the bolts are retracted to disengage with structure 72 enabling removal of the device. Device 70 may also have a manually operated actuator 88, where the device becomes removable from the structure by operating actuator 88.

Figure 7:
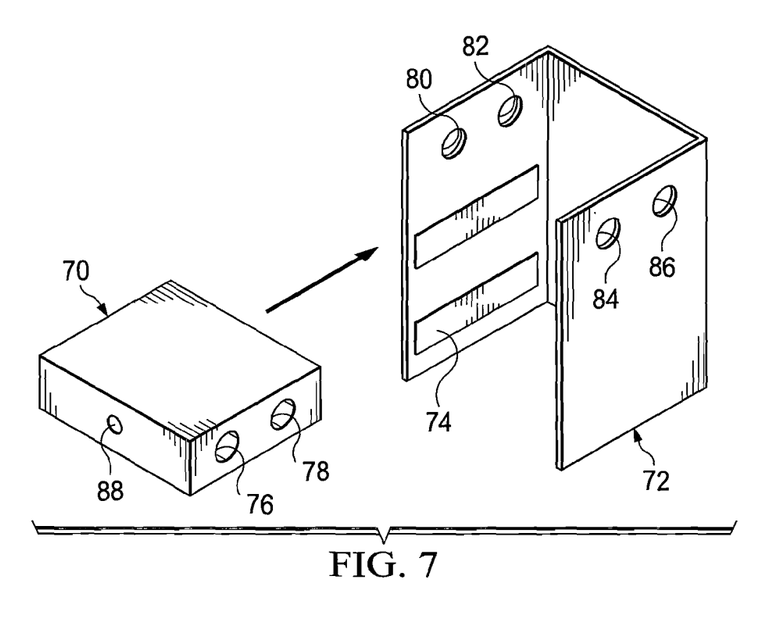
FIG. 7 is an example perspective view of both another embodiment of the device and an embodiment of a structure in which the device may be mounted.

Structure 72 may be arranged to cooperate with the device such that device 10 cannot be opened when mounted in the structure. In these embodiments, device 10 can only be opened once removed from structure 72. This may provide protection against unauthorized removal of the device and unauthorized access to any internal space of device 70.

In one example implementation, structure 72 may be a variant on the 19-inch rack standardized under EIA 310-D, IEC 60297 and DIN 41494 SC48D. The rack is for mounting various electronic modules in a "stack," or rack, 19 inches (482.6 mm) wide. Equipment designed to be placed in a rack is typically described as rack-mount, a rack mounted system, a rack mount chassis, sub-rack, rack mountable, or occasionally, simply shelf. The slang expression for a sub rack (generally 1U=1.75 in=44.45 mm height) is "pizza box" due to the similarity in size and shape. Racks are typically found in data centers and computer rooms.

Figure 8:
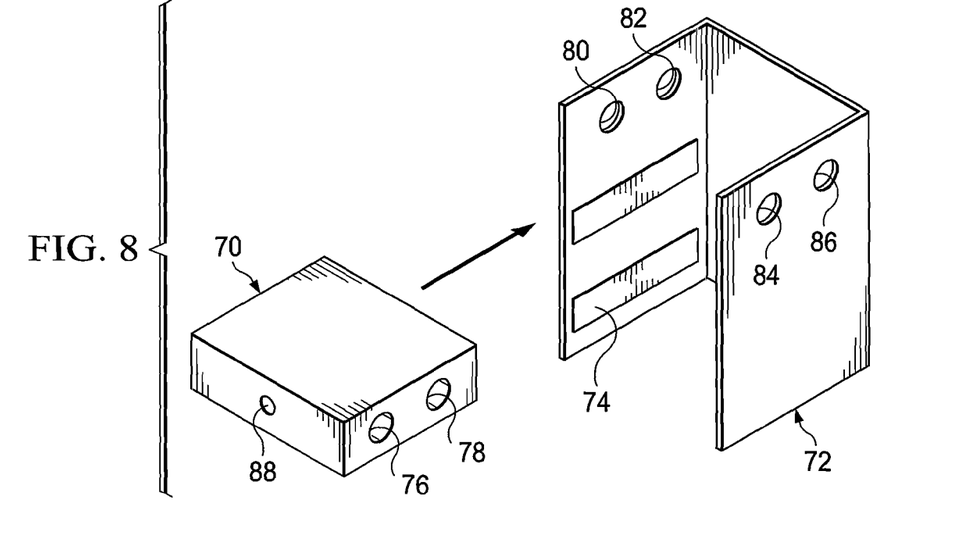
FIG. 8 is an example perspective view of both another embodiment of the device and an embodiment of a structure in which the device may be mounted.

In an alternative embodiment shown in FIG. 8, structure 72 has a security mechanism having a secure mode and a disabled mode, the mode of the security mechanism being determined by a computer program. The security mechanism is arranged for engagement with device 70 in secure mode to prevent removal of the device from structure 72. In this example, the bolts (and their respective apertures 80, 82, 84, and 86) are associated with structure 72 and not the device. In secure mode, the bolts are extended to be located in apertures such as 76 and 78 formed in device 70. In disabled mode, the bolts are retracted from the apertures such as 76 and device 70 is removable from structure 72. Structure 72 may have a logic board 96 that includes a signal receiver to possibly control the security mechanism. The logic board may have its own IP address and receive instructions from a remote device such as remote devices 42 and 58 in FIGS. 4-6. Alternatively, a unit connected to the network and mounted in the rack may control the bolts. Alternatively, there may be an external unit controlling a plurality of bolts in a plurality of racks using an analog signal.

Figure 9:
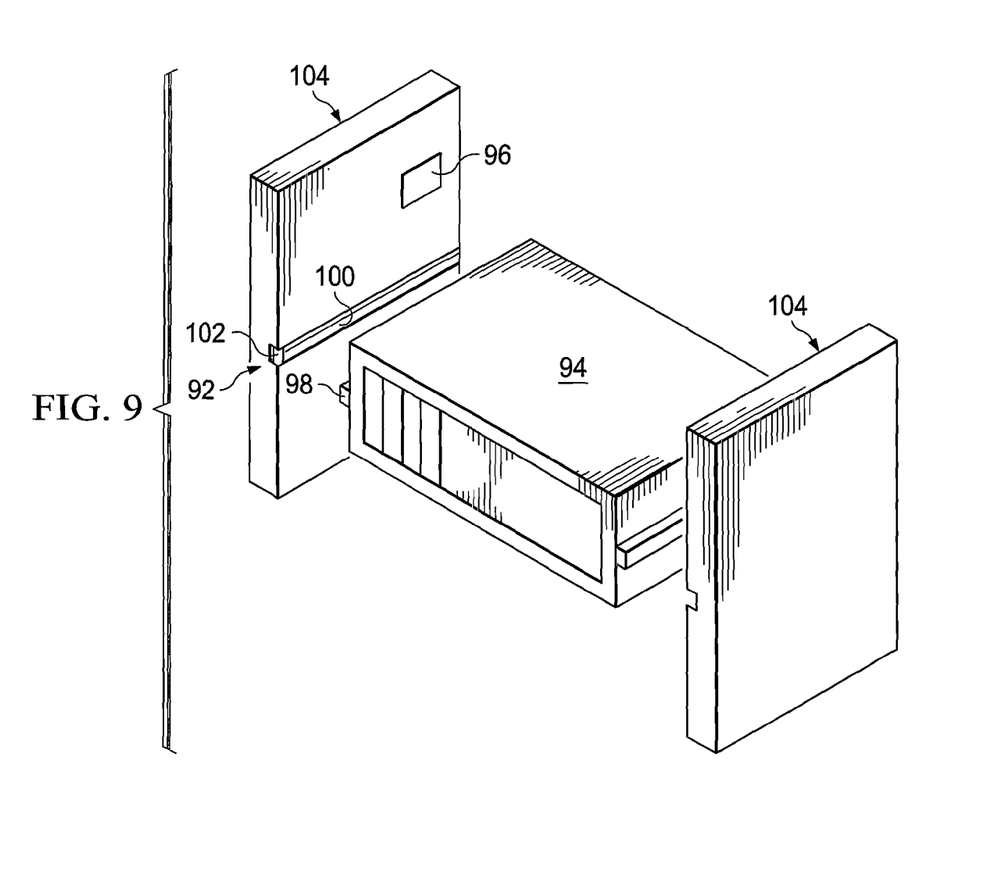
FIG. 9 is an example perspective view of both another embodiment of the device and an embodiment of a structure in which the device may be mounted.

In another embodiment shown in FIG. 9, device 94 has a flange 98 that slides into a slot 100 of a structure 104. A program controls a bolt or stopper 102 located at the end of the slot. Stopper 102 is shown in an extended position blocking the slot, which corresponds to a secure mode, but also has a retracted position corresponding to disabled mode. When device 94 is installed in structure 104 and stopper 102 extended, device 94 cannot be removed from structure 104. Flange 98 is blocked by stopper 102. When the security mechanism is disabled and the stopper retracted, the device can be removed. Structure 104 may have a logic board 96 to control a security mechanism 92, as discussed above.

Note that the remote device (or a local device) can include memory elements for storing information to be used in achieving the security activities, as outlined herein. Additionally, each of these devices may include a processor that can execute software or an algorithm to perform the security activities, as discussed in this Specification. This could be inclusive of software and/or algorithms that may be used to assist in controlling access to any protected electronic component. This can certainly include lookup functions, password authentication, reporting, login information, etc. These network elements may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

It is important to note that the steps in the preceding FIGURES illustrate only some of the possible scenarios that may be executed by, or within, the presented architecture. Some of these steps may be deleted or removed where appropriate, or these steps may be modified or changed considerably without departing from the scope of the described concept. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the proffered system in that any suitable arrangements, chronologies, configurations, and timing mechanisms may be provided without departing from the teachings of the described concept.

Although the present invention has been described in detail with reference to particular embodiments, it should be understood that various other changes, substitutions, and alterations may be made hereto without departing from the spirit and scope of the present invention. The illustrated device and operations have only been offered for purposes of example and teaching. Suitable alternatives and substitutions are envisioned and contemplated by the present invention: such alternatives and substitutions being clearly within the broad scope of the proposed solutions. In addition, while the foregoing discussion has focused on laptop or personal computer security activities, any other suitable environment requiring the protection of important electronic components (e.g., server blades, database architectures, server farms, etc.) may benefit from the teachings provided herein. It should also be noted that the systems described may be constructed of any suitable combination of rubber, plastic, metal, or any other viable composition that could withstand and readily accommodate the forces as explained herein.

Although the described concept has been described in detail with reference to particular arrangements and configurations, these example configurations and arrangements may be changed significantly without departing from the scope of the described concept. For example, the lodging or securing mechanisms may include additional pins, cables, rods, bolts, etc. and virtually any other element that offers such a mechanism (or that can assist) for securing a device.

Numerous other changes, substitutions, variations, alterations, and modifications may be ascertained to one skilled in the art and it is intended that the described concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
   a case having a cover and an internal space formed therein for receiving an electronic device comprising operational components, the case being configured with one or more access areas exposing one or more interfaces of the electronic device; and
   a locking member coupled to the case, the locking member being part of a security protocol having a secure mode and a disabled mode, wherein the locking member restricts movement of the cover in the secure mode, wherein a sensitive portion of the operational components is covered by the case in the secure mode, wherein physical access to only the sensitive portion of the operational components of the electronic device is restricted in the secure mode, and wherein physical access to the sensitive portion of the operational components is enabled in the disabled mode, wherein the exposed one or more interfaces of the electronic device allow electronic operation of the electronic device when the locking member is in the secure mode, wherein a signal receiver is configured to be coupled to the locking member to electronically control the locking member in order to switch between the modes, and wherein a program running on the electronic device is configured to provide a signal to the signal receiver to switch between the modes.

2. The apparatus of claim 1, wherein the program receives instructions for switching the modes from a remote device configured to be coupled to a network.

3. The apparatus of claim 2, wherein the remote device receives a password from an end user seeking to switch to one of the modes and the remote device switches between the modes if the password is authenticated.

4. The apparatus of claim 2, wherein the instructions are provided by a software application being executed on the remote device.

5. The apparatus of claim 1, wherein the locking member includes a manually operated actuator that causes the switch between modes.

6. The apparatus of claim 1, wherein a forced or an unauthorized physical access to the operational components of the electronic device triggers an alert to be sent to an end user responsible for the electronic device.

7. The apparatus of claim 1, wherein the locking member is a bolt that extends and retracts in response to switching between the modes.

8. The apparatus of claim 7, wherein the bolt is an electromechanical element configured to be coupled to an electrical coil, and wherein the electromechanical element responds to an instruction from the signal receiver.

9. A method, comprising:
restricting physical access to operational components of an electronic device through a security protocol having a secure mode and a disabled mode, wherein the electronic device is received in an internal space formed in a case having a cover, the case being configured with one or more access areas exposing one or more interfaces of the electronic device, wherein a sensitive portion of the operational components is covered by the case in the secure mode, wherein physical access to only the sensitive portion of the operational components of the electronic device is restricted in the secure mode, and wherein physical access to the sensitive portion of the operational components is enabled in the disabled mode; and
electronically controlling a locking member coupled to the case, wherein a signal receiver is configured to be coupled to the locking member to electronically control the locking member in order to switch between the modes, wherein the locking member restricts movement of the cover in the secure mode, wherein the exposed one or more interfaces of the electronic device allow electronic operation of the electronic device when the locking member is in the secure mode, and wherein a program running on the electronic device is configured to provide a signal to the signal receiver to switch between the modes.

10. The method of claim 9, wherein the program receives instructions for switching the modes from a remote device configured to be coupled to a network.

11. The method of claim 10, wherein the remote device receives a password from an end user seeking to switch to one of the modes and the remote device switches between the modes if the password is authenticated.

12. The method of claim 10, wherein the instructions are provided by a software application being executed on the remote device.

13. The method of claim 9, wherein a forced or an unauthorized physical access to the operational components of the electronic device triggers an alert to be sent to an end user responsible for the electronic device.

14. A system, comprising:
means for restricting physical access to operational components of an electronic device through a security protocol having a secure mode and a disabled mode, wherein the electronic device is received in an internal space formed in a case having a cover, the case being configured with one or more access areas exposing one or more interfaces of the electronic device, wherein a sensitive portion of the operational components is covered by the case in the secure mode, wherein physical access to only the sensitive portion of the operational components of the electronic device is restricted in the secure mode, and wherein physical access to the sensitive portion of the operational components is enabled in the disabled mode; and
means for electronically controlling a locking member coupled to the case, wherein movement of the locking member controls switching between the modes, wherein the locking member restricts movement of the cover in the secure mode, and wherein the exposed one or more interfaces of the electronic device allow electronic operation of the electronic device when the locking member is in the secure mode, and wherein a program running on the electronic device is configured to provide a signal to the electronically controlling means to switch between the modes.

15. The system of claim 14, further comprising:
means for receiving instructions for switching the modes from a remote device configured to be coupled to a network.

16. The system of claim 15, wherein the remote device receives a password from an end user seeking to switch to one of the modes and the remote device switches between the modes if the password is authenticated.

17. The system of claim 14, wherein a forced or an unauthorized physical access to the operational components of the electronic device triggers an alert to be sent to an end user responsible for the electronic device.

18. The system of claim 14, wherein the locking member is a bolt that extends and retracts in response to switching between the modes.

19. The system of claim 18, wherein the bolt is an electromechanical element configured to be coupled to an electrical coil, and wherein the electromechanical element responds to an instruction from a signal receiver.

20. The apparatus of claim 1, wherein the program receives instructions for switching the modes from a user accessing the electronic device through the one or more exposed interfaces.

21. The method of claim 9, wherein the program receives instructions for switching the modes from a user accessing the electronic device through the one or more exposed interfaces.

* * * * *